United States Patent [19]

Iverson et al.

[11] 4,096,957
[45] Jun. 27, 1978

[54] PIVOT PIN ASSEMBLY

[75] Inventors: Lowell P. Iverson, Aurora; George W. Dirscherl, Chicago; Paul D. Hagen, Yorkville, all of Ill.

[73] Assignee: Caterpillar Tractor Co., Peoria, Ill.

[21] Appl. No.: 816,579

[22] Filed: Jul. 18, 1977

[51] Int. Cl.² ............................................ B23P 19/04
[52] U.S. Cl. ................................. 214/145 R; 403/154; 403/157; 403/16
[58] Field of Search ................ 403/154, 157, 158, 16, 403/19, 161, 163; 214/145 R, 145 D

[56] References Cited

U.S. PATENT DOCUMENTS

| 1,548,376 | 8/1925 | Mullally | 214/145 |
|---|---|---|---|
| 2,967,726 | 1/1961 | Weston | 403/157 |
| 4,022,536 | 5/1977 | Piepho | 403/154 X |

FOREIGN PATENT DOCUMENTS

| 60,697 | 8/1913 | Austria | 403/157 |

*Primary Examiner*—Andrew V. Kundrat
*Attorney, Agent, or Firm*—Wegner, Stellman, McCord, Wiles & Wood

[57] ABSTRACT

A pivot pin assembly for mounting a loader bucket to a loader arm of a tractor. The pivot pin assembly includes a cylindrical pin having spaced-apart retaining sleeves which capture a sleeve bearing therebetween. The retaining sleeves engage the bucket bracket assembly and the bearing engages the loader arm assembly. Flanges on one retaining sleeve engage the bucket bracket assembly to restrict axial movement of the pin in one direction. A cover plate, secured to the bucket bracket over the flanges, restricts axial movement of the pin in the other direction. The flanges define two spaced-apart sides which are retained in a channel on the cover plate to prevent rotational movement of the pin with respect to the loader bucket. The pivot pin assembly may be removed by detaching the cover plate and pulling the pin from the bucket bracket assembly and the loader arm assembly.

6 Claims, 4 Drawing Figures

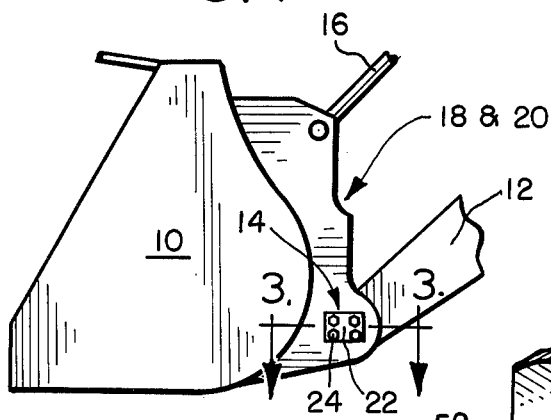
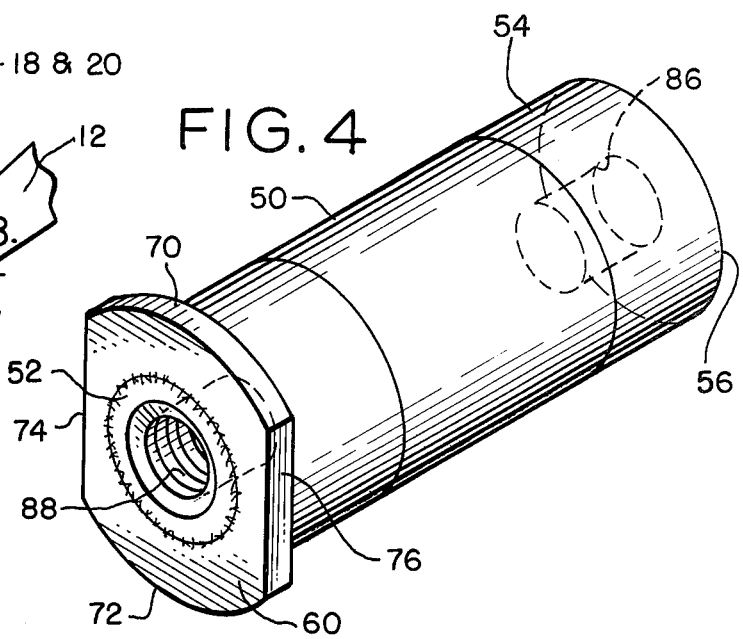
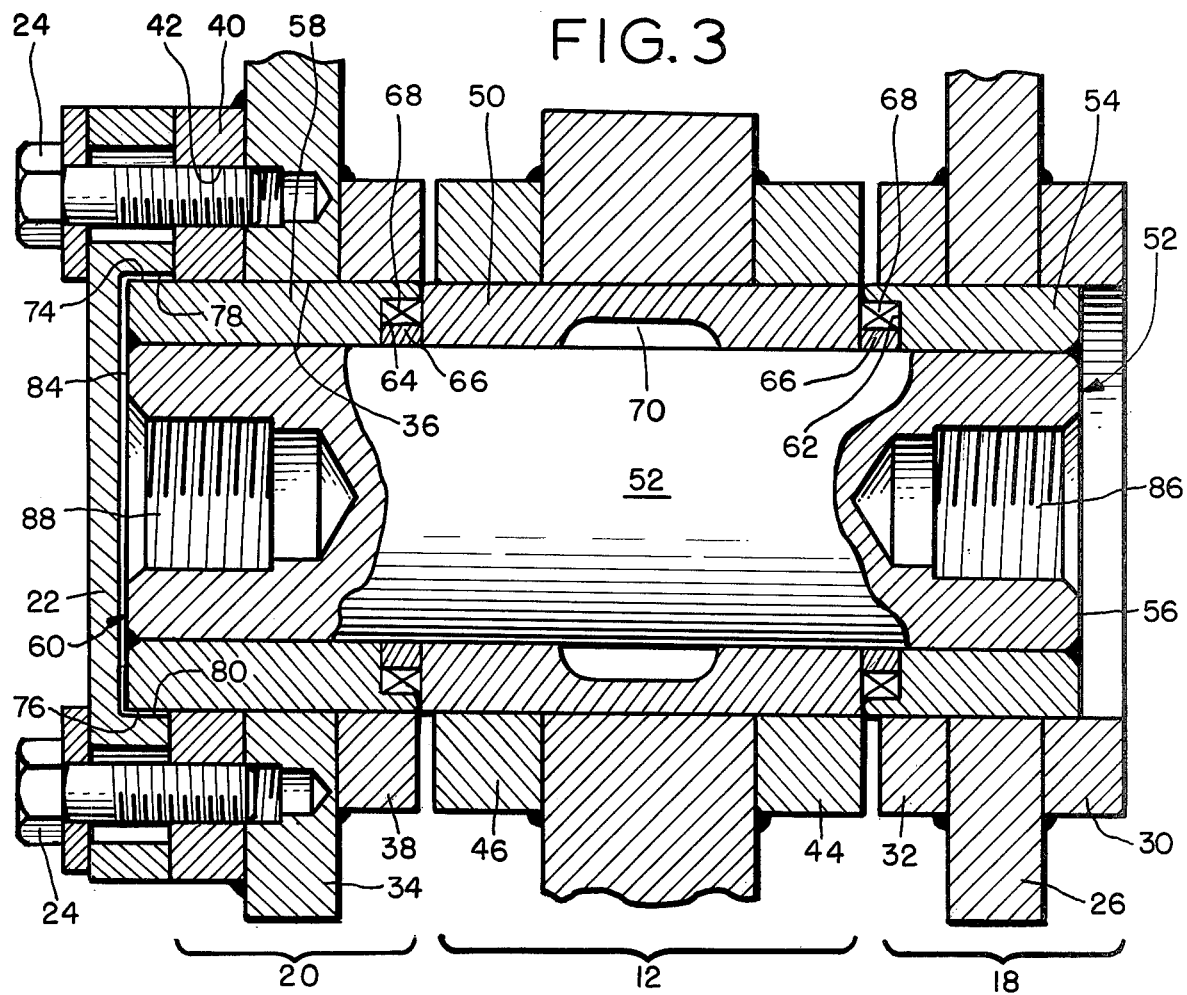

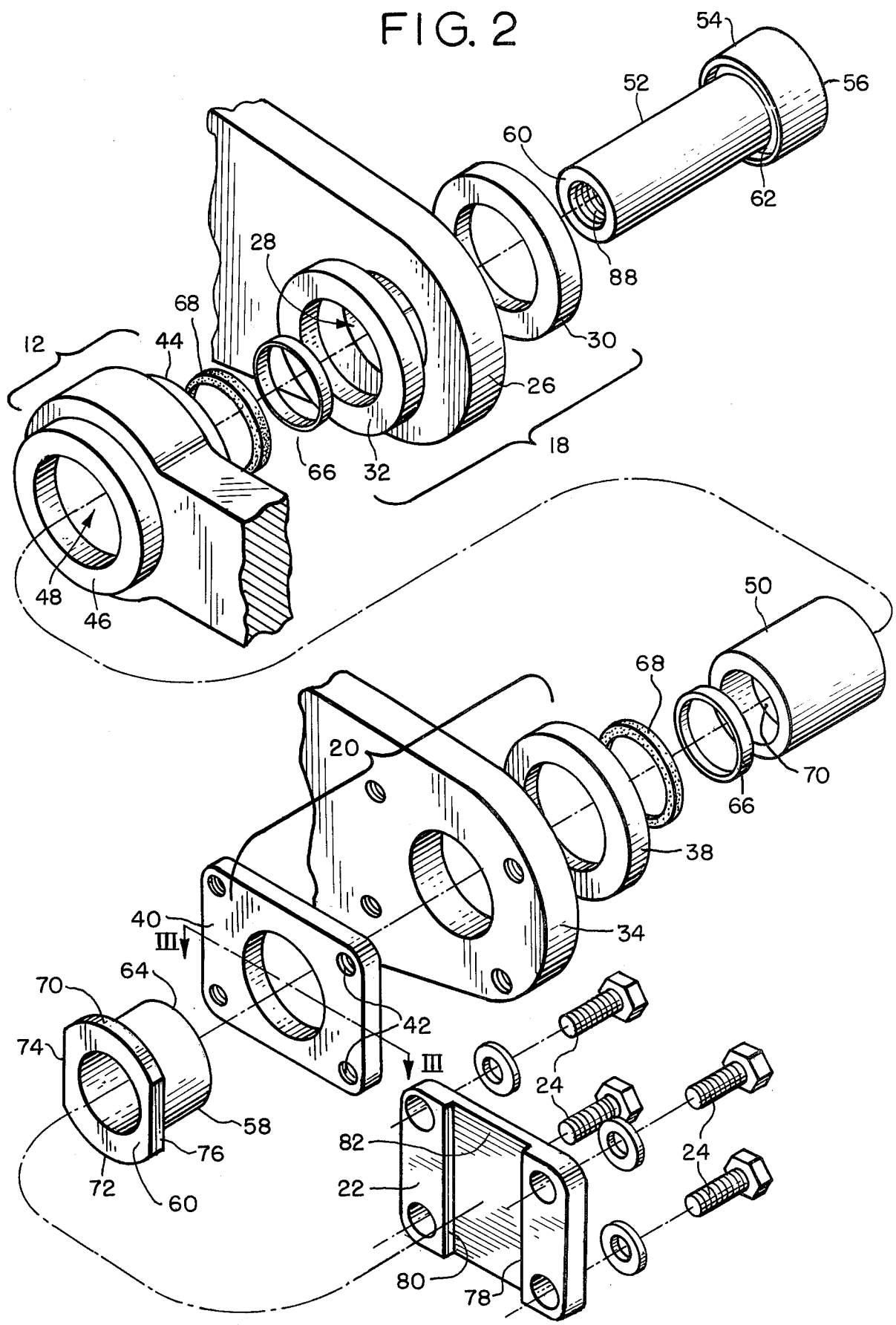

PIVOT PIN ASSEMBLY

BACKGROUND OF THE INVENTION

This invention generally relates to earth-working machinery and, more particularly, to a pivot pin assembly for mounting a loader bucket for rotation about the end of a loader arm assembly.

Loader buckets for earth-working machinery have bucket bracket assemblies integral therewith which receive a pin mounted through the end of a loader arm to provide rotational motion thereabout. Free-floating pin assemblies tend to wear as a result of rotation of the pin with respect to the bucket bracket assemblies.

It is desirable to preclude rotational motion of the pin with respect to the loader bracket while at the same time providing for easy removal of the pin assembly from the loader arm assembly and the bucket bracket assembly.

SUMMARY OF THE INVENTION

The present invention is directed to overcoming one or more of the problems set forth above.

According to the present invention, a pivot pin assembly for mounting a loader bucket on a loader arm restricts rotational and lateral movement of the pin with respect to the bucket and is easily removable from the bucket and the loader arm. The pivot pin assembly includes a cylindrical pin having spaced-apart retaining sleeves secured thereto. A sleeve bearing which engages the loader arm assembly is captured between the retaining sleeves. One retaining sleeve has outwardly extending flanges which abut a bracket on the loader bucket to restrict axial movement of the pin in one direction. A cover plate, secured to the bracket, restricts axial movement of the pin in the other direction. The flanges on the retaining sleeve have two spaced-apart sides which are received in a channel in the cover plate to preclude rotational motion of the pin with respect to the bucket.

DRAWING

FIG. 1 is a side view of the pivot pin assembly mounting a bucket to the loader arm assembly;

FIG. 2 is a detailed perspective view of the pivot pin assembly shown in FIG. 1 mounted in the bucket and the loader arm;

FIG. 3 is a cross-sectional view of the assembly taken through the lines III—III of FIG. 2; and FIG. 4 is a perspective view of the pivot pin assembly removed from the bucket and the loader arm assembly.

DESCRIPTION OF PREFERRED EMBODIMENT

Referring to FIG. 1, a loader bucket 10 is mounted for rotation about a loader arm assembly 12 which is secured to a ground-working implement, as a tractor (not shown). Loader bucket 10 and a pivot pin assembly 14 rotate about the end of the loader arm assembly 12 and bucket position is controlled by hydraulically operated control arms 16. Pivot pin assembly 14 extends through bucket bracket assemblies 18 and 20 which are an integral part of loader bucket 10. A cover plate 22 is secured to bucket bracket assembly 18 by bolts 24. When bolts 24 and cover plate 22 are removed, pivot pin assembly 14 may be pulled from the loader arm assembly 12 and bucket brackets 18 and 20.

Referring to FIGS. 2 and 3, a description of pivot pin assembly 14 and the mounting of loader bucket 10 on loader arm assembly 12 will now be provided. Bucket bracket assembly 18 includes a bracket 26 having a bore 28 and reinforcement rings 30 and 32 secured to the sides of bracket 26, as by welding, to provide structural reinforcement. The inner diameter of rings 30 and 32 is substantially the same as the diameter of bore 28. Similarly, bucket bracket assembly 20 includes a bracket 34 having a bore 36 with reinforcement rings 38 and 40 welded to the sides of bracket 34 to provide structural reinforcement. A reinforcement ring 40 may have a larger outer diameter to accommodate threaded holes 42 which receive bolts 24, as will be explained in greater detail below.

Loader arm assembly 12 has reinforcement rings 44 and 46 secured to each side. A bore 48, extending through loader arm 12 and rings 44 and 46, receives a sleeve bearing 50 mounted for rotation about a cylindrical pin 52.

Cylindrical pin 52 has a retaining sleeve 54 mounted thereon and welded about an end face 56. The axial length of retaining sleeve 54 is sufficient to engage bucket bracket assembly 18, and the outer diameter of sleeve 54 is selected to be snugly fitted in bore 28, as shown in FIG. 3. Similarly, a retaining sleeve 58 is mounted at the opposite end of cylindrical pin 52 and is welded about an end face 60 as shown in FIG. 3. Bearing 50, having a length sufficient to extend across loader arm assembly 12, is captured between interior ends 62 and 64 of retaining sleeves 54 and 58 with thrust bearings 66 and seals 68 therebetween. A cavity 70 in bearing 50 may be provided with a suitable lubricant.

Retaining sleeve 58 has opposed circumferentially extending symmetrical flanges 70 and 72. The flanges have spaced-apart sides 74 and 76 which are generally parallel to each other. Flanges 70 and 72 abut reinforcement ring 40 to restrict axial movement of cylindrical pin 52 toward bucket bracket assembly 20. Edges 78 and 80 define a channel 82 in cover plate 22. Channel 82 is sufficiently deep to provide a space 84 for a small amount of lateral play.

When cover plate 22 is secured to bucket bracket assembly 20 by bolts 24, lateral movement of cylindrical pin 52 is restricted in both directions by flanges 70 and 72 captured by bucket bracket assembly 18 and cover plate 22. Also, rotational movement of pin 52 with respect to loader bucket 10 is restricted by sides 74 and 76 of flanges 70 and 72 engaging edges 78 and 80 of channel 82.

Referring to FIG. 4, cylindrical pin 52 may be provided with puller holes 86 and 88 on end faces 56 and 60, respectively, to enhance the removal of the pivot pin assembly 14 from the bucket brackets and the loader arm as shown.

The embodiments of the invention in which an exclusive property or privilege is claimed are defined as follows:

1. In a loader bucket having a bucket bracket assembly secured thereto and mounted for rotation about a loader arm assembly of an earth-working implement, an improved pivot pin assembly for mounting the bucket brackets to the loader arm assembly comprising:

an elongated cylindrical pin having a first end face and a second end face;

a first retaining sleeve having an inner surface and an outer surface and an interior end and an exterior end, the inner surface engaging the cylindrical pin, the exterior end of said first sleeve being secured to the first end face of the elongated cylindrical pin, the outer surface of the sleeve engaging the bucket bracket assembly of the loader bucket;

a second retaining sleeve having an inner surface and an outer surface and an interior end and an exterior end, the inner surface engaging the cylindrical pin, the exterior end of the second sleeve being secured to the second end face of the elongated cylindrical pin, the outer surface of the sleeve engaging the bucket bracket assembly of the loader bucket, flange means extending outwardly from the exterior end of the second retaining sleeve for abutting the bucket bracket assembly, the flange means defining two spaced-apart sides;

a sleeve bearing having an inner bearing surface engaging the cylindrical pin and an outer surface engaging the loader arm assembly, the sleeve bearing captured between the interior surface of the first and the second retaining sleeves; and a cover plate mounted on the bucket bracket assembly having a channel for capturing the flanges between the cover plate and the bucket bracket assembly for restricting axial movement of the elongated cylindrical pin, and said two spaced-apart sides retained in the channel for restricting rotational movement of the elongated pin with respect to the loader bucket.

2. The loader bucket assembly of claim 1 wherein the sleeve bearing has a cavity therein for receiving a lubricant, and seals are disposed between the sleeve bearing and said interior end surface of the first and the second retaining sleeves.

3. The loader bucket assembly of claim 1 wherein said flange means defining two spaced-apart sides includes opposed circumferential extending symmetric flanges and said spaced-apart sides are generally parallel.

4. The loader bucket assembly of claim 1 wherein the bucket bracket assembly and the loader arm assembly are provided with reinforcement rings.

5. The loader bucket assembly of claim 1 wherein the first and the second retaining sleeves are secured to the elongated cylindrical pin by a weld on the first end face and the second end face, respectively.

6. The loader bucket assembly of claim 1 wherein the elongated cylindrical pin is provided with a first puller hole in the first end face and a second puller hole in the second end face.

* * * * *